United States Patent [19]
Park

[11] Patent Number: 6,055,233
[45] Date of Patent: Apr. 25, 2000

[54] AUGMENTED RING-BANYAN NETWORK AND METHOD FOR CONTROLLING ROUTING THEREIN

[75] Inventor: Jae-Hyun Park, Seoul, Rep. of Korea

[73] Assignee: SamSung Electronics Co., Ltd., Suwon, Rep. of Korea

[21] Appl. No.: 08/950,099

[22] Filed: Oct. 14, 1997

[30] Foreign Application Priority Data

Oct. 14, 1996 [KR] Rep. of Korea ............. 96-45749

[51] Int. Cl.[7] ............. H04L 12/28; H04L 12/56; H04Q 11/00
[52] U.S. Cl. ............. 370/388; 370/411; 370/380
[58] Field of Search ............. 370/411, 351, 370/355, 388, 386, 380, 370; 712/392, 12

[56] References Cited

U.S. PATENT DOCUMENTS

| | | | |
|---|---|---|---|
| 4,345,326 | 8/1982 | Dieudonne et al. | 370/351 |
| 4,380,063 | 4/1983 | Janson et al. | 370/235 |
| 4,627,048 | 12/1986 | Larson | 370/355 |
| 4,630,260 | 12/1986 | Toy et al. | 370/355 |
| 4,656,622 | 4/1987 | Lea | 370/353 |
| 4,661,947 | 4/1987 | Lea et al. | 370/355 |
| 4,761,780 | 8/1988 | Bingham et al. | 370/411 |
| 4,939,726 | 7/1990 | Flammer | 370/400 |
| 4,985,889 | 1/1991 | Flankish et al. | 370/395 |
| 5,132,965 | 7/1992 | Zhang | 370/393 |
| 5,166,926 | 11/1992 | Cisneros et al. | 370/392 |
| 5,175,733 | 12/1992 | Nugent | 370/400 |
| 5,179,551 | 1/1993 | Turner | 370/398 |
| 5,420,982 | 5/1995 | Take | 712/12 |
| 5,519,698 | 5/1996 | Lyles et al. | 370/411 |
| 5,602,844 | 2/1997 | Lyles | 370/395 |
| 5,636,210 | 6/1997 | Agrawal | 370/390 |
| 5,642,349 | 6/1997 | Cloonan et al. | 370/395 |
| 5,651,003 | 7/1997 | Pearce et al. | 370/395 |

OTHER PUBLICATIONS

"The Ring–Banyan Network: A Fault Tolerant Multistage Interconnection Network With An Adaptive Self–routing"; International Conference on Parallel and Distributed Proceeding System; p. 196–203: Park, Yoon, Lee, Eun: Dec. 1992.

Primary Examiner—Hassan Kizou
Assistant Examiner—John Pezzlo
Attorney, Agent, or Firm—Robert E. Bushnell, Esq.

[57] ABSTRACT

An augmented ring-banyan network utilizing the adaptive self-routing control algorithm in the ATM switching system comprises qth($\geq 1$, interger) augmenting stage having prescribed switch elements each connected to the switch elements of the final stage in said ring-banyan network respectively, and q+1st augmenting stage having prescribed switch elements each connected to said prescribed switch elements of said qth($q \geq 1$, interger) augmenting stage respectively, wherein the topology for the output links of each of said switch elements is represented as follows:

$$\beta_1[(P_l, P_{l-1}, \ldots, P_1)_i] = (P_l, P_{l-1}, \ldots, P_1)_{i+1} \text{ connectedwithlink}(P_l, P_{l-1}, \ldots, P_1, 1)_i$$

$$\beta_0[(P_l, P_{l-1}, \ldots, P_1)_i] = (P_l, P_{l-1}, \ldots, P_1)_{i+1} \text{ connectedwithlink}(P_l, P_{l-1}, \ldots, P_1, 0)_i$$

Provided:

$l = (\log_2 N) - 1, \; i \geq l+1.$

9 Claims, 8 Drawing Sheets

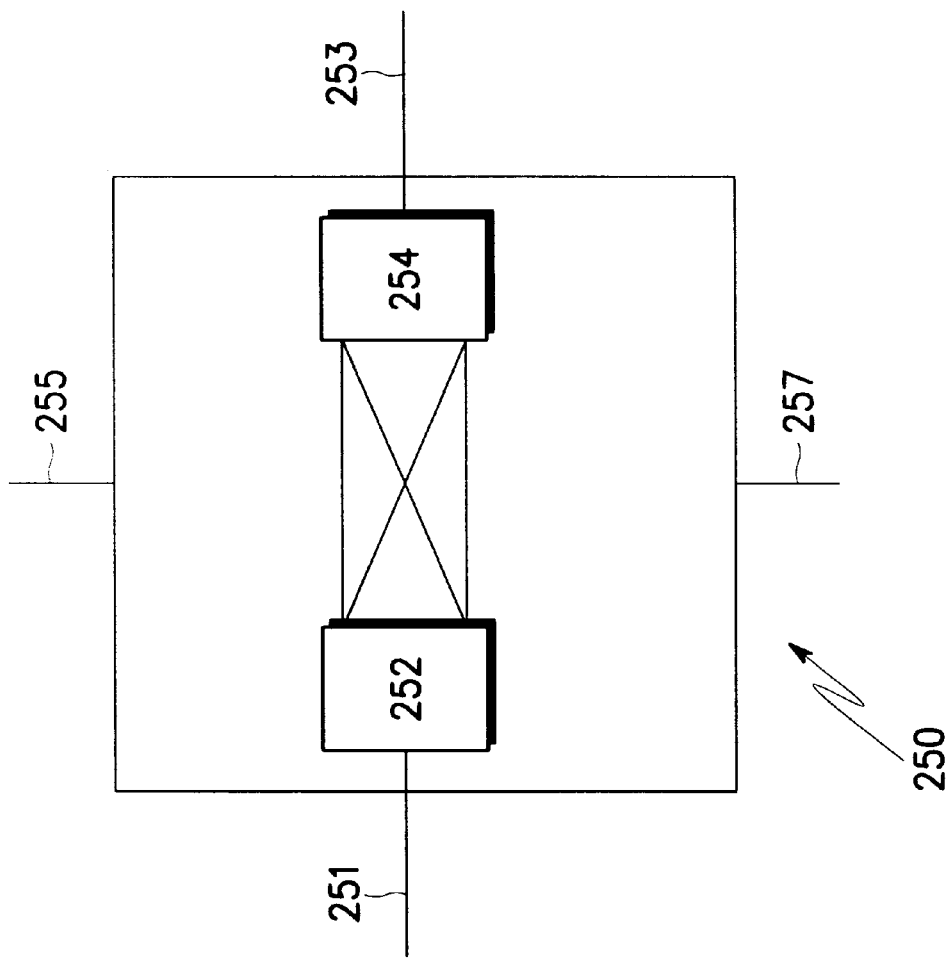

AUGMENTED RING-BANYAN NETWORK AND METHOD FOR CONTROLLING ROUTING THEREIN

CLAIM OF PRIORITY

This application makes reference to, incorporates the same herein, and claims all benefits accruing under 35 U.S.C. §119 from an application for AUGMENTED RING-BANYAN NETWORK AND METHOD OF CONTROLLING ROUTING THEREOF earlier filed in the Korean Industrial Property Office on Oct. 14, 1996 and there duly assigned Serial No. 1996-45749, a copy of which application is annexed hereto.

BACKGROUND OF THE INVENTION

1. Field of the Invention

The present invention relates to the switching fabric in a B-ISDN switching system, and more particularly to an enhanced ring-banyan network and a method for controlling routing in such a network.

2. Description of the Related Art

A class of multiple interconnection network (MIN) architectures with considerable commercial potential for fast, broadband switching applications is the banyan network architecture defined by Goke and Lipovski. The banyan architecture provides parallel connections between processors and storage device modules and is a good substitute for the crossbar switch in terms of effectiveness in contradistinction to cost. Enhancements of the basic banyan structure have been proposed to provide further improvements in performance by taking advantage of the underlying relationships between the nodes and links in such networks.

A banyan network as so defined provides unique paths between processors and storage device modules. More particularly, the set of paths destined for a switch element (SE) constitutes a spanning tree, and the set of paths from the switch element also forms a spanning tree. However, only a certain class of spanning trees, from among all such spanning trees, is important in this regard. This class is defined by the property that all switch elements belonging to the class can deliver a packet through the same output port by using a basic self-routing control method for the network. Thus, the performance of the banyan network may be considered in terms of the relationships between and limitations on equivalence classes of paths.

Commercial systems implementing banyan networks have already been introduced, but their performance has in practice been rather low. This is because each pair of the input/output ports (one input port and one output port) has only a single path between the ports. The absence of alternative paths between input ports and output ports has the consequence that, when random internal collisions occur between two data units being transmitted across the network, one of these data units will be lost. These collisions, therefore, deteriorate the overall performance of the network.

Enhancements of the basic banyan architecture, as represented by the delta network, offer improvements upon its performance. For example, "augmented" banyan networks can provide improved performance by supplementing the spanning trees of the basic network with alternative paths. In one type of augmented banyan network, such alternative paths arise through additional links that chain together various switch elements corresponding to the same stage of the network tree. When a collision occurs at a selected output link of a switch element, a data unit (such as a packet) being transmitted across the network can be delivered from that switch element to another switch element at the same level within the tree. Thus redirected, the data unit being transmitted across the network (hereinafter referred to as a "data transmission") can be properly delivered to its intended destination port by means of the existing self-routing control algorithm corresponding to the network.

In a load-sharing banyan network (or B-network), on the other hand, additional links may provide alternative paths by connecting switch elements in a given stage to other switch elements in adjacent stages. The adjacent stage, relative to a switch element of which the additional link connects a switch element of the given stage, may either precede or succeed the given stage. This arrangement enables the network to avoid loss of transmissions, which otherwise would arise from collisions at switch element output links, in a manner essentially similar to the redirection that occurs in an augmented banyan network.

The B-network and the intrastage augmented network both provide robustness against processing malfunctions arising from collision-engendered transmission losses. Their success derives from the existence of supplemental links that permit data transmissions to proceed over additional, alternative paths in the event of collisions. They in fact have improved reliability relative to the basic banyan network; however, they too can suffer degraded performance due to data loss. In particular, if a collision at an output port of the penultimate stage causes a data transmission to be redirected to an alternate switching element of the final stage, then the supplemental links may not suffice to provide a path to the switching element of the destination port. In such a case the transmission must be discarded, just as any collision in the basic banyan network causes the discard of a transmission.

A promising type of augmented banyan network has been proposed and termed the "ring-banyan" network. See J. Park, et al., *The Ring-Banyan Network: A Fault Tolerant Multistage Interconnection Network with an Adaptive Self-Routing*, PROC. 1992 INT'L CONF. PARALLEL & DISTRIBUTED SYSTEMS, December 1992, at 196–203. A ring-banyan network comprises a basic banyan structure augmented by additional links between successive switch elements within each stage, so that each stage of the network comprises a closed chain of switching elements. Such a structure can significantly decrease the frequency of data loss due to collisions between transmissions traversing the network simultaneously.

The ring-banyan structure shares the limitation of other augmented banyan networks that a data transmission arriving at the final stage in the wrong switching element may not be deliverable to its intended output port and thus may be discarded. The authors of the cited paper, however, recognized and focused their efforts upon a separate issue. In particular, they noticed that the failure in the ring-banyan structure of the final stage output link connected with the designated output port would result in the loss of the data transmission intended for that port. A failure of any one of the intrastage links in the final stage would similarly prevent a data transmission misdirected at the final stage from reaching its designated destination port.

The paper's authors addressed these related problems by modifying the basic ring-banyan topology to include a final stage made up of a series of interconnected switch element pairs, instead of a series of single switch elements. In this way, the failure of any one intrastage link or output link in the final stage would not cause the network itself to malfunction. This modified ring-banyan structure included, as well as an additional set of final-stage switch elements and a mesh of links between the final-stage switch element pairs, two sets of supplementary 1×2 switches positioned after the final stage of switch elements. The supplementary switches allowed each switch element of each switch element pair in the final stage to connect with either of the two output ports corresponding to that switch element pair.

The cited reference provided a complex but insightful solution to the problem addressed therein. However, it did not consider the more fundamental problem that misdirected data transmissions may be lost in the final stage, even without a link failure. This "no-fault" data loss problem has appeared to constitute an intrinsic weakness of augmented banyan networks, including the ring-banyan network.

We have, therefore, found that a need continues to exist for an enhanced MIN architecture and associated self-routing method that provide greater robustness against transmission losses than is provided by existing link-augmented banyan networks. A network with such an architecture should comprise the same node and link hardware arrangements as existing networks, yet it should also have substantial resistance to transmission losses arising from redirection to an alternative path at the final stage of the network. Preferably, a network with this architecture could be constructed by a simple modular addition to a basic or link-augmented network. Ideally, it would eliminate or substantially reduce the incidence of "no-fault" data losses but would require hardware and interconnections no more complex, at worst, than the hardware and interconnections of the existing network.

SUMMARY OF THE INVENTION

Accordingly, it is an object of the present invention to provide an augmented Ring-Banyan network and a routing control method thereof, wherein the above network comprises a part for processing a misrouted packet which has failed to arrive at the destination in the final stage. According to the present invention, an augmented ring-banyan network comprises a qth augmenting stage (q≧1, ∈N) having prescribed respective switch elements each connected to the respective switch elements of the final stage in said ring-banyan network, and a (q+1)st augmenting stage having prescribed switch elements each connected to said prescribed switch elements of said qth augmenting stage, respectively, wherein the topology for the output links of each of the switch elements is represented as follows:

$$\beta_1[(P_l, P_{l-1}, \ldots, P_1)_i] = (P_l, P_{l-1}, \ldots, P_1)_{i+1} \text{ connected with link}(P_l, P_{l-1}, \ldots, P_1, 1)_i,$$

$$\beta_0[(P_l, P_{l-1}, \ldots, P_1)_i] = (P_l, P_{l-1}, \ldots, P_1)_{i+1} \text{ connected with link}(P_l, P_{l-1}, \ldots, P_1, 0)_i,$$

where $l = (\log_2 N) - 1$, $i \geq l+1$, and $\gamma_l[n_{i,j}] = n_{i,(j+1) \bmod (N/2)}$.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, but which are attached only by way of example, wherein:

FIG. 6 shows a block diagram of a switch element for use as an alternative to the switch element of FIG. 2 in the augmented ring-banyan network of FIG. 4.

DETAILED DESCRIPTION OF THE PREFERRED EMBODIMENT

The present invention will hereinafter be described and defined with reference to numerous specific details such as concrete constituent elements of the network. However, in the following description, these specific examples are given only for the purpose of allowing those skilled in the art to better understand the present invention, and they should in no way be construed, either explicitly or implicitly, to limit the scope of the invention itself. For example, the following description will consider the specific case where the data transmissions being communicated over a network are data packets. This reference is not intended and should not be construed to imply that the present invention is limited to the case of packetized transmissions.

Figure 1:
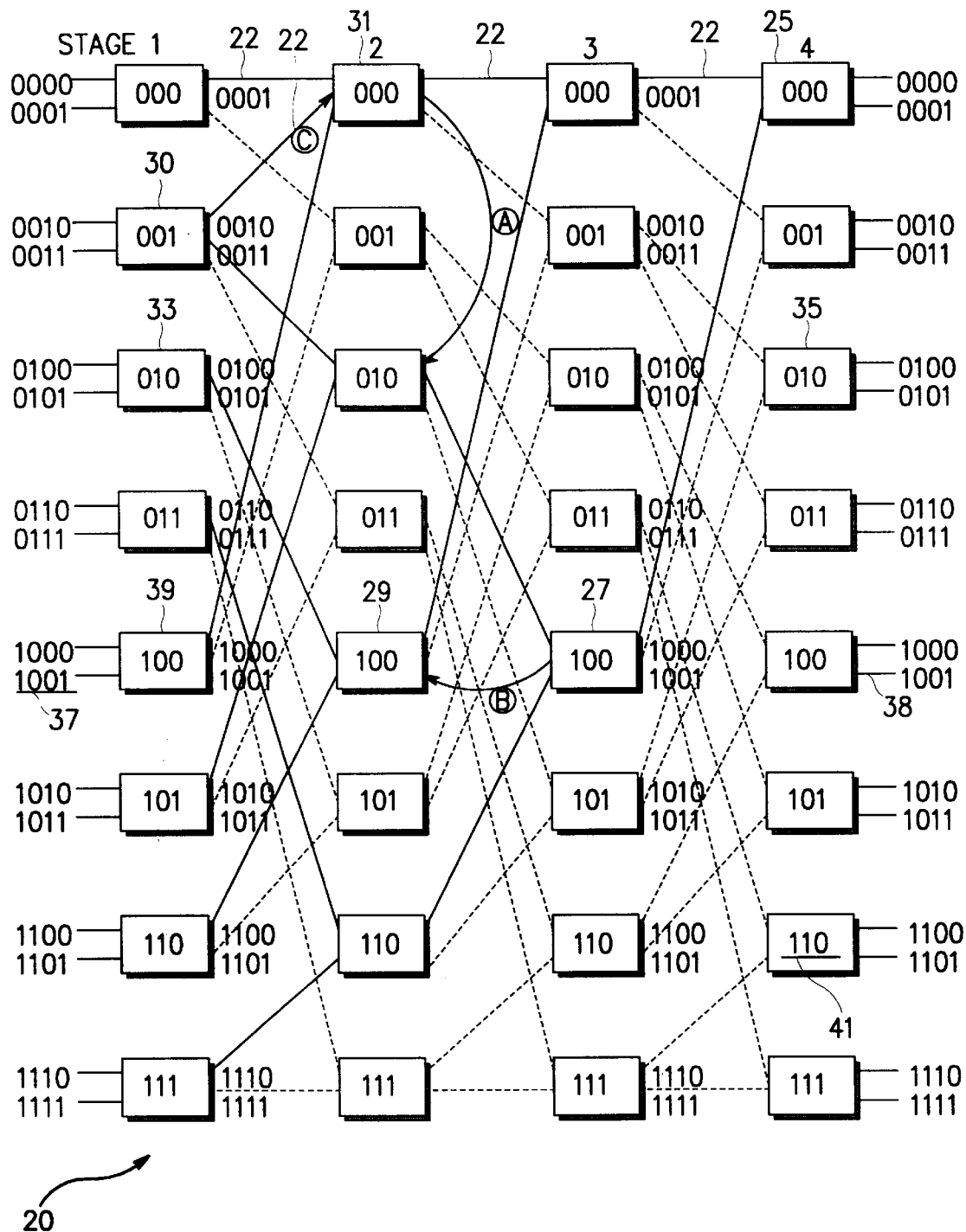
FIG. 1 is a block diagram illustrating the equivalence classes and the alternative paths of the spanning trees and switching elements in a delta network (with N=16)

FIG. 1 is a block diagram illustrating the arrangement of links and nodes in an exemplary delta network 20 (for a particular case in which the number of input ports and output ports, respectively, is N=16). The links depicted by continuous lines in FIG. 1, such as links 22, form a spanning tree that represents an equivalence class of spanning trees for the output ports of a switching element 25 corresponding to the identifier 000 at stage 4 of this network. Continuous lines also depict several supplemental links, which are denoted by the reference characters A, B, and C and which add alternative paths to the tree. Trees such as this consist of the links from all the output nodes (referred to as "roots" of trees) to all the input nodes (referred to as "leaves" of trees), together with nodes representing the switch elements of the network.

The network of FIG. 1 also illustrates an additional, intrastage link A, such as might exist in an augmented banyan network. Link A provides supplemental paths between the ports of input/output pairs for which the single path provided by the basic network includes the switch elements connected by the additional link. These supplemental paths allow the delivery of a data transmission to its correct destination output port, through application of the network's existing self-routing control algorithm, even when a collision occurs on the path provided by the basic network. When such a collision occurs, the data transmission can be delivered from that switch element to another switch element in the same stage of the network.

Links B and C of FIG. 1 illustrate supplemental links in a B-network and a Load-Sharing Banyan Network, where a backward or forward link connects a switch element 27 at a given stage to a switch element 29 in a preceding stage or a switching element 30 in a given stage to a switching element 31 in a succeeding stage, respectively, thereby providing alternative paths. The preceding-stage switch element 27 may be termed a "parent," because of its position in a lower-numbered or earlier stage, and similarly the succeeding-stage switch element 31 may be termed a "child." When a collision occurs, a blocked data transmission can be delivered instead to the parent (or child) switch element, at a stage lower (or higher) within the tree, through link B (or C) in FIG. 1.

An augmented ring-banyan network according to one embodiment of the present invention utilizes a routing algorithm appropriate to the basic ring-banyan network. Moreover, the complexity of the switching elements of the augmented network is maintained the same as those of the basic network.

An explanation of the topological relationship between the routing control algorithm and the switch elements of the basic banyan network will be presented first, because the ring-banyan structure derives from the basic banyan architecture. The following discussion will refer to the delta network for the sake of simplicity and clarity, and because it is widely known that many multistage interconnection networks (MINs) are topologically equivalent. Also, the discussion will refer to nodes and links through a numbering convention of the same type as that proposed in C. L. Wu & T. Feng, *On a Class of Multistage Interconnection Networks,* IEEE TRANS. COMP., v. C-29, August 1980, at 694–702. This convention will be used both to describe the configurations of the delta network and the ring-Banyan network and to prove the validity of the routing control method.

The switching elements (SEs) of the network 20 depicted in FIG. 1 form a regular array of columns and rows. Each column is termed a "stage" and corresponds to a serial step in a communication process between one of the input ports on the left side of the array, such as input port 33, and one of the output ports on the right side, such as output port 35. Each stage has N input links and N output links. It will be assumed for the sake of the present discussion that $N=2^n$, for some positive integer n. Persons of ordinary skill in the networking arts will readily observe, however, that the present invention applies, with appropriate modifications, for any integer N with $N \geq 4$.

The stages are numbered consecutively from 1 to $\log_2 N$, beginning with the leftmost stage as stage 1. For each of the stages, each link (input or output) associated with the stage has a relative position, with respect to the top of the stage, that can be identified by a binary numeral, such as link position identifier 37, having $\log_2 N$ digits. In the arrangement of FIG. 1, each stage has at each such position one input link and one output link. It is noted that these link positions are numbered consecutively, from top to bottom, beginning with 0.

A link in a given stage can be represented by an expression $\text{link}(p_{\log_2 N}, p_{(\log_2 N)-1}, \ldots, p_1)$, where $(p_{\log_2 N}, p_{(\log_2 N)-1}, \ldots, p_1)$ is the binary identifier for the position of the link. In network 20 of FIG. 1, for example, the lower position of switch element 39, which is the fifth SE from the top of stage 1, has associated with it link position identifier 37 having the binary value 1001, which is the binary representation of the number 9. The identifier value 1001 thus indicates the fact that this position is the tenth position from the top of the stage (recalling that, unlike the stages, these positions are numbered beginning with zero).

An output link at a given position, such as output link 38, is represented by the expression link(1001)

An SE of a given stage has a relative position, with respect to the top of the stage, that will be termed the "level" of the SE and can be identified by a level identifier, such as level identifier 41, that is a binary numeral with $(\log_2 N)-1$ digits. The levels are numbered consecutively, from top to bottom and beginning with 0, in a manner similar to the numbering of the link positions. It is noted that, for the system of FIG. 1, each level identifier corresponds to the three most significant bits of the link position identifiers associated with the SEs at that level. Each SE can be represented generically by an expression $(p_{(\log_2 N)-1}, p_{(\log_2 N)-2}, \ldots, p_1)$, in a manner similar to the representation of a given link.

The destination port of an input packet can be identified by a binary numeral having $\log_2 N$ digits and corresponding to the link position of the destination port in the final stage of the network. A generic object address can be represented by an expression $A=(a_1, a_2, \ldots, a_{\log_2 N})$.

The delta network exemplified by network 20 has the following topological definition.

Definition 1: For each SE $(p_{(\log_2 N)-1}, p_{(\log_2 N)-2}, \ldots, p_1)$ at a stage i of the delta network, each output link of the SE is connected with an input link of stage i+1 in accordance with $$\beta_0[(P_l, P_{l-1}, \ldots, P_1)_i] = (P_l, P_{l-2}, \ldots, P_1, 0)_{i+1} \text{ connected with link}(P_l, P_{l-1}, \ldots, P_1, 0)_i$$

and $$\beta_1[(P_l, P_{l-1}, \ldots, P_1)_i] = (P_l, P_{l-2}, \ldots, P_1, 1)_{i+1} \text{ connected with link}(P_l, P_{l-1}, \ldots, P_1, 1)_i$$

where $l=(\log_2 N)-1, 0 \leq i \leq l$.

For $j \in \{0,1\}$, the function $\beta_j$ defines a mapping from a switch element $SE_1$ at the stage i to a switch element $SE_2$ at an adjacent stage i+1 according to $\beta_j[SE_1]=SE_2$. $\beta_j$ is useful for deriving the topological relationships between the switch elements in a banyan network. $\beta_j$ can also be used to describe the set of attainable switch elements for a particular link. In accordance with the convention for the binary link-position identifiers, $\beta_0$ denotes a mapping for the upper output link of switch element $SE_1$, and $\beta_1$ denotes the corresponding mapping for the lower output link of the switch element $SE_1$.

The symbol $n_{ij}$ is defined to indicate a particular switch element by its stage and level.

Definition 2: $n_{ij}$ is a switch element located at level j of stage i, where $1 \leq i \leq \log_2 N$, $0 \leq j < N/2$.

It will now be shown that, for each stage of network 20 of FIG. 1, an equivalence relation exists between the network output ports for which a path exists from a given switch element of the stage to the output port.

Definition 3: For the self-routing control function $\alpha_i$ implemented in the delta network, $R(n_{ij})$ denotes the set of output links in the final stage (i.e., the stage $\log_2 N$) attainable from the switch element $n_{ij}$; that is, $R(n_{ij})$ is the set of output links reached when $\alpha_i$ is applied to all of the available object addresses A, where $\alpha_i$ is defined by $$\alpha_i[(P_l, P_{l-1}, \ldots, P_1)_i, (a_1, a_2, \ldots, a_{l+1})] = (P_{l-1}, P_{l-2}, \ldots, P_1, a_i)i+1 \text{ connected with link } (P_l, P_{l-1}, \ldots, P_1, a_i)_i.$$

The expression $(a_1, a_2, \ldots, a_{l+1})$ above represents an available object address, potentially associated with a packet, to which the function $\alpha_i$ is to be applied. When a packet arrives at an input link of a switch element of stage i, the function $\alpha_i$ is applied to its address in order to transfer the packet through an output link to a switch element at the stage i+1.

Definition 4: The relation "~" defined on the set $A_i \times A_i$ is given by $$n_{i,j} \sim n_{i,k} \Leftrightarrow R(n_{i,j}) = R(n_{i,k}),$$

where $A_i$ is the set of switch elements at stage i.

Lemma 1: The relation "~" is an equivalence relation.

The fact that "~" defines an equivalence relation facilitates the proof of certain properties of the delta network that are useful for deriving an adaptive self-routing control method.

Theorem 1: Let i denote a given stage of the delta network (for which $1 \leq i \leq \log_2 N$). If the switch elements $n_{i,p}$ and $n_{i,q}$ belong to the same equivalence class with respect to the relation "~", then their level identifiers both terminate with the same (i-1)-digit binary sequence $(d_1, d_2, \ldots, d_{i-1})$; that is, if $n_{i,p}$ has the identifier $(P_{l-i+1}, \ldots, P_1, d_1, d_2, \ldots, d_{i-1})_i$, then $n_{i,q}$ has the identifier $(Q_{l-i+1}, \ldots, Q_1, \overline{d_1, d_2, \ldots, d_{i-1}})_i$. Moreover, when i=1, that is, at the first stage, all the switch elements belong to a single equivalence class.

Proof: By mathematical induction. From the definition of the routing control function $\alpha_i$ at the final stage, i.e., at stage $\log_2 N$, $$\alpha_{\log_2 N}[(P_l, P_{l-1}, \ldots, P_1)_{\log_2 N}, (a_1, a_2, \ldots, a_{l-1})] = \text{link}(P_l, P_{l-1}, \ldots, P_1, a_{l+1})_{\log_2 N}.$$

Moreover, by the definition of $R(n_{ij})$ and the distinctness of the output ports of the delta network, whenever $j \neq k$ for switch elements at the stage $\log_2 N$ we have $R(n_{\log_2 N, j}) \neq R(n_{\log_2 N, k})$. This is equivalent to the statement that when level q differs from level p, i.e., $n_{\log_2 N, q} \neq n_{\log_2 N, p}$, for each output port $\text{link}(P_{\log_2 N}, P_{\log_2 N-1}, \ldots, P_1)_{\log_2 N}$ of switch element $n_{\log_2 N, p}$ and output port $\text{link}(Q_{\log_2 N}, Q_{\log_2 N-1}, \ldots, Q_1)_{\log_2 N}$ of switch element $n_{\log_2 N, q}$, there exists a k, $1 \leq k \leq \log_2 N$, such that $P_k \neq Q_k$. Thus, each of the switch elements at stage $\log_2 N$ corresponds to a different equivalence class, and no two such switch elements have output links that share a common link position identifier.

If the consequent is true for the stage k+1, then it follows that $$\alpha_{\log_2 N}[\ldots[\alpha_{k+2}[\alpha_{k+1}[(P_l, \ldots, P_{k+1}, P_k, P_{k-1}, \ldots, P_1)_{k+1}, (a_1, a_2, \ldots, a_{l+1})]]] \ldots] = \text{link}(P_k, P_{k-1}, \ldots, P_1, a_{k+1}, \ldots, a_{l+1})_{\log_2 N}$$

It therefore follows, from the definition of $\alpha_i$, that at stage k $$\alpha_{\log_2 N}[\ldots[\alpha_{k+1}[\alpha_k[(P_l, P_{l-1}, \ldots, P_{K+1}, P_k, P_{k-1}, P_{k-2}, \ldots, P_1)_k, (a_1, a_2, \ldots, a_{l+1})]]] \ldots] = \alpha_{\log_2 N}[\ldots[\alpha_{k+1}[(P_{l-1}, \ldots, P_{k+1}, P_k, P_{k-2}, \ldots, P_1, a_k)_{k+1}, (a_1, a_2, \ldots, a_{l+1})]] \ldots]$$

Upon application of the earlier result for stage k+1, then, $$\alpha_{\log_2 N}[\ldots[\alpha_{k+1}[\alpha_k[(P_l, P_{l-1}, \ldots, P_{k+1}, P_k, P_{k-1}, P_{k-2}, \ldots P_1)_k, (a_1, a_2, \ldots, a_{l+1})]]] \ldots] = \text{link}(P_{k-1}, P_{k-2}, \ldots, P_1, a_k, \ldots, a_{l+1})_{\log_2 N}.\square$$

Theorem 1 provides a basis for the following definitions and results, which establish a topological characterization of the ring-banyan architecture.

Definition 5: At stage i in the delta network, the switch element that is k levels away from the switch element $n_{ij}$ is given by the function $\gamma_k$ defined by $$\gamma_k[n_{i,j}] = n_{i,(j+k) \mod (N/2)}, \text{ where } k \geq 0.$$

The following corollary and theorem constitute the basis of the network and the adaptive routing control method of the present invention.

Corollary 1:

$$\beta_k[n_{i,j}] = \beta_k[\gamma_{(2^{i-1})}[n_{i,j}]], \text{ where } k \in \{0,1\}.$$

Proof: Apply Definition 5 and Theorem 1 above.$\square$

Theorem 2:

$$\beta_j[\gamma_d[(P_l, P_{l-1}, \ldots, P_1)_i]] = \gamma_{2d}[\beta_j[((P_l, P_{l-1}, \ldots, P_1)_i]],$$

where $1 \leq i < \log_2 N$, $j \in \{0,1\}$.

Proof: Let j=1. We have, by Definitions 1 and 5, $$\beta_1[\gamma_1[(P_l, P_{l-1}, \ldots, P_1)_i]] = \gamma_2[\beta_1[((P_l, P_{l-1}, \ldots, P_1)_i]].$$

Now assume the consequent for j=d; that is, assume that $$\beta_1[\gamma_d[(P_l, P_{l-1}, \ldots, P_1)_i]] = \gamma_{2d}[\beta_1[((P_l, P_{l-1}, \ldots, P_1)_i]].$$

It follows from Definition 5 that $$\beta_1[\gamma_{d+1}[(P_l, P_{l-1}, \ldots, P_1)_i]] = \beta_1[\gamma_d[\gamma_1[(P_l, P_{l-1}, \ldots, P_1)_i]]]$$

$= \gamma_{2d}[\beta_1[\gamma_1[(P_l, P_{l-1}, \ldots, P_1)_i]]]$, by the assumption for the case j=d;

$= \gamma_{2d}[\gamma_2[\beta_1[(P_l, P_{l-1}, \ldots, P_1)_i]]]$, by the result for d=1;

$= \gamma_{2(d+1)}[\beta_1[(P_l, P_{l-1}, \ldots, P_1)_i]]$, by Definition 5.

This proves the equality for $\beta_1$. The case for $\beta_0$ follows in a similar manner, *mutatis mutandis*.$\square$ The following Lemma 2 shows that a path starting from an output link can be replaced with another path starting from another output link within the same switch element.

Lemma 2: For $1 \leq i < \log_2 N$, (a) $\beta_1[n_{i,j}] = \gamma_1[\beta_0[n_{i,j}]]$ and (b) $\gamma_{2^{i-1}}[\beta_1[n_{i,j}]] = \beta_0[n_{i,j}]$.

Proof: Part (a) follows from Definitions 1 and 5. For part (b), we have from part (a) that $$\gamma_{(2^i)-1}[\beta_1[n_{i,j}]] = \gamma_{(2^i)-1}[\gamma_1[\beta_0[n_{i,j}]]]$$

$= \beta_0[\gamma_{2^{i-1}}[n_{i,j}]]$ by Definition 5 and Theorem 2.

Now, by Corollary 1, $$\beta_k[n_{i,j}] = \beta_k[\gamma_{2^{i-1}}[n_{i,j}]], \text{ for } k \in \{0,1\}.$$

Part (b) therefore obtains.$\square$

As the foregoing discussion indicates, banyan networks have topological properties that make them attractive starting points from which to derive new, malfunction-resistant MIN structures and appropriate self-routing control methods for those structures. If interconnections are established between switch elements within a stage (e.g., from a switch element $n_{ij}$ to another switch element $\gamma_k[n_{ij}]$), then all the additional links as well as all the existing links can be used for adaptive routing control. There may be various kinds of interconnections to provide paths from a switch element $n_{ij}$ to another switch element $\gamma_k[n_{ij}]$.

The ring-banyan architecture specifies a particular type of intrastage connection between switching elements, and it provides a network with efficiency and cost advantages relative to the basic banyan network. The following discussion will describe the ring-banyan structure and explain an appropriate self-routing control method for it.

First, the structural features of the ring-banyan network will be presented. An N×N ring-banyan configuration can be obtained from an N×N delta network, such as that depicted in FIG. 1, by the addition of links connecting all of the switching elements of a stage into a chain. Implementation of these additional links requires the network to comprise augmented switching elements, each having a chain-in link and a chain-out link as well as the input/output links appropriate for the delta architecture.

Figure 2:
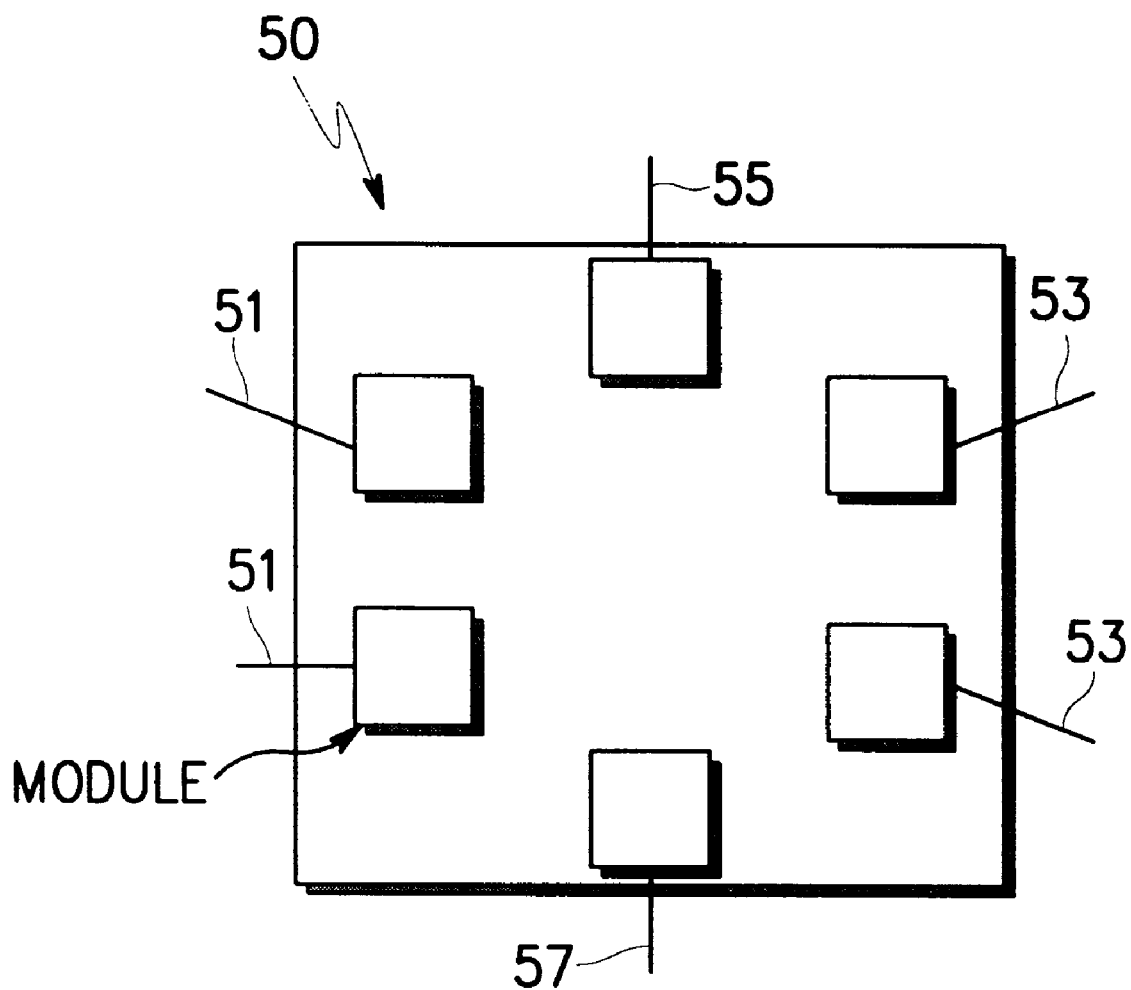
FIG. 2 is a block diagram illustrating the configuration of a switch element having a chain-in link and a chain-out link as required for use in a ring-banyan network.

FIG. 2 illustrates, in block form, a switch element 50 having the additional links appropriate for use in a ring-banyan network. The configuration of switch element 50 is derived from a 2×2 configuration having only two input links 51 and two output links 53, such as would be used in the delta network 20 of FIG. 1. One chain-in link 55 and one chain-out link 57 haste been added to the configuration of a 2×2 switch. Switch element 50 is thus a 3×3 crossbar switch that operates in accordance with a self-routing control method to be described below.

Definition 1 and the following Definition 6 provide a precise topological characterization of the ring-banyan structure.

Definition 6: The chain-out link of a switching element $n_{ij}$ in a ring-banyan network connects to the chain-in link of the switching element $\gamma_1[n_{ij}]$ given by $$\gamma_1[n_{i,j}] = n_{i,(j+1) \mod (N/2)}.$$

Figure 3:
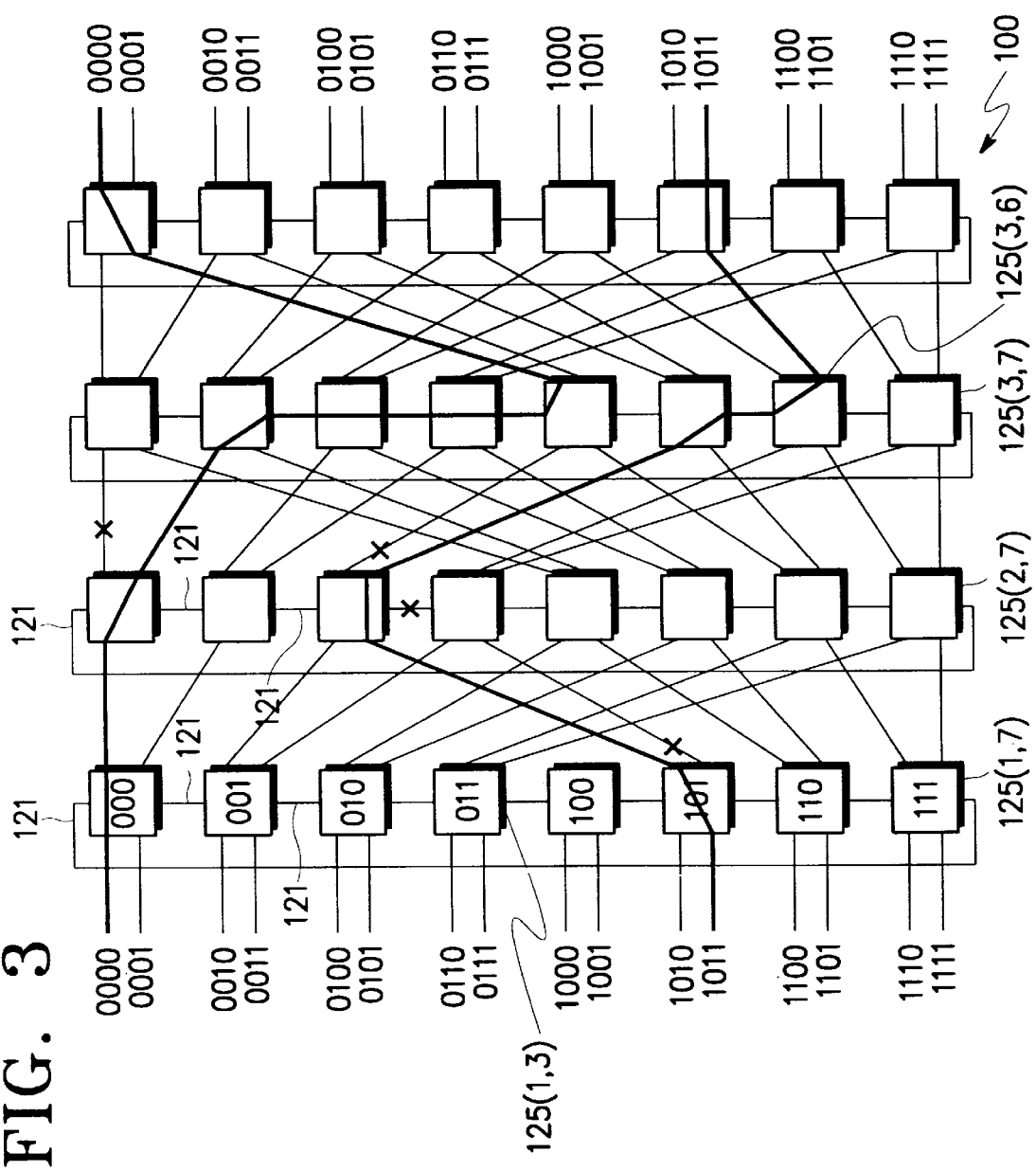
FIG. 3 is a block diagram illustrating the configuration of a ring-banyan network (with N=16)

FIG. 3 shows an example of a 16×16 ring-banyan network 100 configured from the general 16×16 delta network 20 of FIG. 1. The function $\gamma_1$ maps a given switch element to another switch element within the same stage. The physical channels for these intrastage transmissions are provided by intrastage connections such as links 121.

A ring-banyan network, like many other MIN systems, performs routing control by means of destination tags. It also uses, for each packet, a deviation tag K having a fixed size of $\log_2(N/2)$ binary digits. The deviation tag is updated at each stage to represent the value of a generalized (i.e., topological) distance between the switch element that actually receives the packet and the originally intended switch element (or a switch element equivalent to the originally intended switch element). Here the originally intended switch element is that element at a given stage that would have received the packet in accordance with the self-routing system of the underlying banyan network. The value of K for a selected switch element depends upon the current value of K, the selected link, and the originally intended link.

At each stage, therefore, the destination address of a packet in transit across the ring-banyan network comprises a pair (A,K). K has the value 0 when the packet arrives at an input link of stage 1 of the network, i.e., the packet has the destination address (A,0). The routing control method set forth in Definition 7 determines thereafter how successive switching elements transfer the packet and update the value of K.

Definition 7: Let (A,K) denote the destination address for an input packet π to be transferred across a ring-banyan network, and let $\alpha_i$ denote the routing control function for the banyan network from which the ring-banyan network is configured. Let $\bar{s}$ denote the binary complement of $s \in \{0,1\}$; that is, $\bar{s}=1$ when $s=0$, and $\bar{s}=0$ when $s=1$.

(A) The following steps define a link allocation procedure that, together with the updating procedure of part (B) below, defines an adaptive routing control method for routing packets from a switch element $n_{ij}$ in the ring-banyan network:

1. If K=0, then
    (a) send π to $\beta_s[n_{ij}] = \alpha_i[n_{ij},A]$;
    (b) if (a) fails, send π to $\beta_{\bar{s}}[n_{ij}]$;
    (c) if (c) fails, send π to $\gamma_1[n_{ij}]$.

2. If K≠0, then
    (a) send π to $\gamma_1[n_{ij}]$;
    (b) if (a) fails, send π to $\beta_1[n_{ij}]$
    (c) if (b) fails, send π to $\beta_0[n_{ij}]$.

(B) The adaptive routing method of part (A) includes updating K at each stage i in accordance with the following procedure:

1. If K=0, then
    (a) If $\alpha_i[n_{ij},A] = \beta_0[n_{ij}]$ but the $\beta_0$ link fails and $\beta_1[n_{ij}]$ is selected in accordance with (A)(1)(b) above, then set $K \leftarrow 2^i - 1$;
    (b) If $\alpha_i[n_{ij},A] = \beta_1[n_{ij}]$ but the $\beta_1$ link fails and $\beta_0[n_{ij}]$ is selected in accordance with (A)(1)(b) above, then set $K \leftarrow 1$;
    (c) If $\gamma_1[n_{ij}]$ is selected in accordance with (A)(1)(c), then set $K \leftarrow 2^{i-1} - 1$.

2. If K≠0, then
    (a) If $\alpha_i[n_{ij},A] = \beta_j[n_{ij}]$ and $\beta_j[n_{ij}]$ is selected, for $j \in \{0,1\}$, then set $K \leftarrow 2K$;
    (b) If $\alpha_i[n_{ij},A] = \beta_0[n_{ij}]$ but the $\beta_0$ link fails and $\beta_1[n_{ij}]$ is selected in accordance with (A)(1)(b) above, then set $K \leftarrow 2K - 1$;
    (c) If $\alpha_i[n_{ij},A] = \beta_1[n_{ij}]$ but the $\beta_1$ link fails and $\beta_0[n_{ij}]$ is selected in accordance with (A)(1)(b) above, then set $K \leftarrow 2K + 1$;
    (d) If $\gamma_1[n_{ij}]$ is selected in accordance with (A)(1)(c), then set $K \leftarrow K - 1$.

The following Theorem 3 shows that, for any SE not in the final stage of the ring-banyan network, a packet can be routed to either of the SE's output links, or to the chain-out link, and still be deliverable to a designated output port of the network.

Theorem 3: Let $1 \leq i \leq \log_2 N - 1$ and $0 \leq j < N/2$. For each port of $n_{ij}$ connected with $\beta_0[n_{ij}]$, $\beta_1[n_{ij}]$, or $\gamma_1[n_{ij}]$, a valid path exists, in accordance with the self-routing method of Definition 7, through the port from $n_{ij}$ to a designated output port of the network.

Proof. From Lemma 2, it follows that, when $\alpha_i[n_{ij},A] = \beta_s[n_{ij}]$, a valid alternative path exists through the port connected with $\beta_{\bar{s}}[n_{ij}]$ (where $\bar{s}$ denotes the binary complement of $s \in \{0,1\}$), that, instead of the intended output link as alternative path for correctly arriving at the destined output node, another output link can be utilized. Similarly, by Theorem 1, a valid alternative path exists through the port connected with $\gamma_1[n_{ij}]$, that is, through the chain-out port. Conversely, if a valid path exists through the chain-out port, then Theorem 2 provides that a valid alternative path exists through $\beta_{\bar{s}}[n_{ij}]$, $s \in \{0,1\}$. □

Theorem 4 shows the validity of the adaptive routing control algorithm of Definition 7 for the ring-banyan network.

Theorem 4: The routing control method of Definition 7, as applied in a ring-banyan network, correctly delivers an input packet with an arbitrary destination tag to the indicated destination port.

Proof. The method first allocates an available link in accordance with the procedure of part (A). Theorem 3 provides the existence of a valid path from that link to the destination port.

Next, the method updates the deviation tag K in accordance with the procedure of part (B). The following shows that this updating procedure actually causes the packet to proceed along a path to the destination port.

(1) For (B)(1)(a) and (B)(1)(b), apply Lemma 2. For (B)(1)(c), apply Theorem 1.

(2) For (B)(2)(a), apply Theorem 2. For (B)(2)(b) and (B)(2)(c), apply Lemma 2 and Theorem 2.

(3) K represents the required number of additional routing steps through successive levels of the present stage, by means of the chain-in and chain-out links, for the packet to proceed to the next stage on a path to the destination port and in accordance with the routing method. Thus, step (B)(2)((d) correctly updates the value of K.

It, therefore, follows, from Lemmas 1 and 2 and Theorem 2 that the routing control procedure of Definition 7, including the updating protocol for K as provided in part (B), delivers each packet correctly to its indicated destination port in the final stage.

The constraint that Theorem 3 applies only for $1 \leq i \leq \log_2 N - 1$ represents a substantial limitation on the effectiveness of the ring-banyan structure because it excludes any inference that a packet can reach its indicated destination port if it arrives at the final stage ($i = \log_2 N$) in the incorrect switching element.

Figure 4:
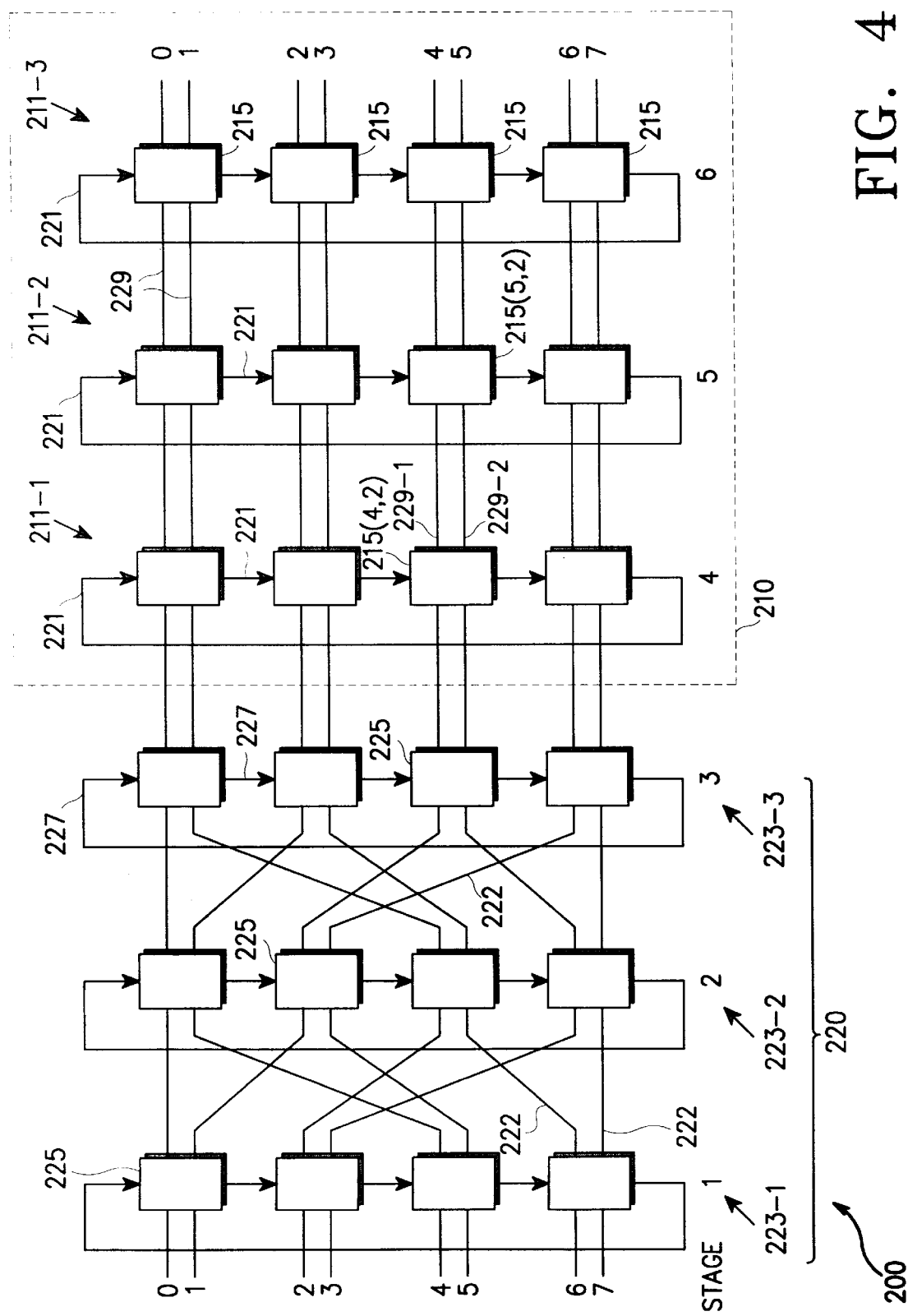
FIG. 4 is a block diagram illustrating the configuration of an augmented ring-banyan network (with N=16) according to an embodiment of the present invention.

FIG. 4 illustrates the configuration of an augmented ring-banyan network 200 (for an exemplary case where N=8) in accordance with a first embodiment of the present invention. An augmenting block 210 has several augmenting stages 211-1, 211-2, and 211-3. Generally, augmenting block 210 comprises a plurality of augmenting stages 211, a first one of which (here, augmenting stage 211-1) couples to the N=8 output links of an existing ring-banyan network 220. In the exemplary network 200 of FIG. 4, ring-banyan network 220 has $\log_2 N = 3$ stages. The structure of ring-banyan network 220 has the same basic topological characteristics as delta network 20 of FIG. 1 and ring-banyan network 120 of FIG. 3, as will be summarized below. The numbering convention presented above for stages, levels, and link positions in the delta network 20 of FIG. 1 and the ring-banyan network 120 of FIG. 3 will carry forward to ring-banyan network 220 of FIG. 4.

Each augmenting stage 211 includes N/2=4 switch elements 215, with one switch element 215 positioned at each level of ring-banyan network 220. We can designate particular switch elements 215 by the reference numbers 215 (i,j), where as usual i and j indicate the stage and level, respectively, of the switch element. To maintain consistency with the numbering convention for ring-banyan network 220, the stages of augmenting block 210 are numbered consecutively beginning with the number next following the number of the final stage of ring-banyan network 210. Thus, stage 211-1 corresponds to stage number i=4, stage 211-2 corresponds to stage number i=5, and stage 211-3 corresponds to stage number i=6. The levels of augmenting block 210 correspond directly to the levels of ring-banyan network 220. The third stage element from the top in stage 211-2, therefore, is switch element 215(5,2) (again recalling that $0 \leq j < N/2$).

Each stage 211 of augmenting block 210 includes intrastage connections 221 substantially the same as intrastage connections 121 of ring-banyan network 100 of FIG. 3. Each switch element 215 may be substantially identical to switch element 50 shown in FIG. 2. Each intrastage connection 221 comprises the chain-out link 57 of a first switching element 215(ij) connected to chain-in link 55 of switching element 215(i,(j+1)mod(N/2)). Thus, intrastage connections 221 join the switch elements 215 of each stage 211 into a ring with the same structure as the stages of ring-banyan network 220.

The banyan network aspect of ring-banyan network 220 has the same topological description as presented above with respect to delta network 20 of FIG. 1 and ring-banyan network 120 of FIG. 3. That is, ring-banyan network 220 comprises interstage connections 222 linking together $\log_2 N = 3$ stages 223-1, 223-2, and 223-3, respectively. Each stage 223 includes N/2=4 switch elements 225, each of which can be identified uniquely by the reference numbers 225(i,j) in the same manner as with switch elements 215 of augmenting block 210. The structure of each switch element 225 is identical to the structure of switch element 50 shown in FIG. 2. Interstage connections 222 join together switching elements 225 in adjacent stages 223 and are defined for ring-banyan network 220, as for delta network 20 and ring-banyan network 120, in accordance with $\beta_0$ and $\beta_1$ of Definition 1.

Augmenting block 210 also includes interstage connections 229 that connect successive stages 211. The interstage topology of augmenting block 210 differs substantially, however, from the interstage topology of ring-banyan network 220. For $1 \leq i < \log_2 N$ and $0 \leq j < N/2$, each output link 53 (see FIG. 2) of switch element 225(i,j) connects to an input link 51 of a switch element 225 of stage i+1 in accordance with $\beta_0$ and $\beta_1$ as provided next in Definition 8.

Definition 8: Let $l = \log_2 N - 1$. For $i \geq l+1$, each output link of switch element $(p_{(\log_2 N)-1}, p_{(\log_2 N)-2}, \ldots, p_1)$ at stage i of an augmenting block of an augmented ring-banyan network is connected with an input link of stage i+1 in accordance with $$\beta_0[(P_l, P_{l-1}, \ldots, P_1)_i] = (P_l, P_{l-1}, \ldots, P_1)_{i+1} \text{ connected with link}(P_l, P_{l-1}, \ldots, P_1, 0)_i;$$

$$\beta_1[(P_l, P_{l-1}, \ldots, P_1)_i] = (P_l, P_{l-1}, \ldots, P_1)_{i+1} \text{ connected with link}(P_l, P_{l-1}, \ldots, P_1, 1)_i.$$

The addition of augmenting block 210 to ring-banyan network 220 significantly increases the probability that a packet will arrive at the correct terminal switch element, and therefore be deliverable to its destination output port. This performance enhancement results from the orderly flow pattern to which most packets conform in traversing augmenting block 210, in contrast to the random flow that normally exists in ring-banyan network 220. The following discussion will describe these contrasting flow patterns and explain their relevant effects.

To traverse ring-banyan network 220, a packet typically must transfer from a level J, where it enters the network through an input port of a switch element $n_{l,J}$, to a level J' corresponding to the switch element connected to the packet's destination output port. This transfer requirement arises because the basic function of a network switch, such as augmented ring-banyan network 200, is exactly to transfer a data transmission from an input channel to a desired output channel. No orderly relationship exists between the input level and the output level of a packet, and so packets traverse ring-banyan network 220 in a random flow pattern as each follows a path to the switch corresponding to its destination port.

Most packets arrive at the final stage of ring-banyan network 220 at the correct switch element corresponding to their destination ports. During its traverse a packet may encounter a collision (or fault) at the output link specified for stage i by the self-routing function $\alpha_i$. The adaptive self-routing method set forth in Definition 7 then specifies how the switch element $n_{ij}$ should redirect the packet, either to an alternate output link or to the chain-out link of $n_{ij}$. The packet then proceeds on an alternative path that has a high probability of carrying the packet to the correct switch element. The fact that the switch elements 225 of each stage 223 are chained together provides additional paths that allow most packets to arrive at the correct switch element of the final stage, even if they become redirected in transit. Thus, all but a few packets arrive at the final stage 223-3 of ring-banyan network 220 at the correct level to be output from network 200 through their destination ports.

Some of those few packets misdirected at the final stage of ring-banyan network 220 may reach their correct levels through intrastage connections 227, but others may not. Without augmenting block 210, those packets that did not reach their correct switch elements would necessarily be discarded at the final stage 223-3. Augmenting block 210 significantly reduces the incidence of these packet losses through orderly packet flow.

Because most packets reach augmenting block 210 at their correct output levels, only a few packets will require transfer between levels by augmenting block 210. This fact is reflected in the interstage topology of augmenting block 210, as set forth in Definition 8, which provides interstage connections 229 between switch elements 215 at the same level j only. After traversing ring-banyan network 220, most packets require no transfer between levels and traverse augmenting block 210 at a single level to reach their destination ports.

This orderly flow pattern substantially reduces the chance that a packet will encounter a collision, and thus be redirected, after it enters augmenting block 210. First, only a low probability exists that two packets exiting ring-banyan network 220 at their correct respective levels will collide with each other. Such a collision can occur only when the paths of the two packets cross. But because each one of two such packets will traverse augmenting block 210 at the same link position at each stage i, their paths will cross only if they both have the same designated output port. If they do, however, a high probability exists that one of them will have been redirected to an alternate path upon or before reaching final stage 223-3 of ring-banyan network 220. Thus, only a small likelihood exists that either of two such packets will reach final stage 211-3 of augmenting block 210 at the wrong level. An even smaller likelihood exists that a packet would be both lately misrouted and also unable to reach the correct level for its designated output port.

Second, a packet that enters augmenting block 210 at the wrong level must reach the correct level by transferring between levels through one or more of intrastage connections 221. Such a packet may possibly collide with another packet at one of stages 211 of augmenting block 210. The other packet could be either another packet similarly misdirected from stage 223-3, or a packet that entered augmenting block 210 at the correct level and is proceeding along that level toward its designated output port. At each successive stage i of augmenting block 210, the likelihood increases that a packet that must change levels to reach its designated output port will have reached the correct level and can proceed as if it had entered block 210 at the correct stage. We see that each of the two recited collision possibilities for a misdirected packet becomes less likely at each succeeding stage. Augmenting block 210, therefore, tends to direct to their correct levels packets that enter it at an incorrect level, while tending to keep at their correct levels those packets that enter at their correct respective levels. Thus, augmenting block 210 enhances the reliability of ring-banyan network 220.

This enhancement of performance occurs because intrastage connections 221 of augmented block 210 provide alternate paths, but these alternate paths are utilized only if, and for as long as, needed to direct a misdirected or redirected packet to its correct level. To accomplish this selective path use, augmenting block 210 employs a simplified routing control method as given by Definition 9.

Definition 9: An augmenting block attached to a ring-banyan network routes packets in accordance with the method of Definition 7, except for the following modifications:

(A)
1. If K=0, then
 (a) send $\pi$ to $\beta_0$;
 (b) if (a) fails, send $\pi$ to $\beta_1$;
 (c) if (b) fails, sent $\pi$ to $\gamma_1[n_{ij}]$.

(B) The deviation tag K is not updated except for the following two cases:
1. If K=0 and $\gamma_1[n_{ij}]$ is selected, then set K←K+1;
2. If K≠0 and $\gamma_1[n_{ij}]$ is selected, then set K←K−1.

A packet is routed repeatedly through the augmented network by using the existing adaptive routing method and, consequently, the packets arriving at the desired destination are delivered to the output port through the output link, which can thus reduce the discard possibility of packets.

In order to utilize such paths, it is necessary to simplify the routing control algorithm for the switch element of the augmented stages.

(1) The k value is unchangeable except in cases where the packet is sent out through $\gamma_k[.]$, whereby k value is changed into k−1, or k equals zero(0) and $\gamma_1[.]$ is selected.

(2) When k=0, the switch element allocates links by attempting to send out the packet first to $\beta_0[.]$ and next to $\beta_1[.]$.

Figure 5A:
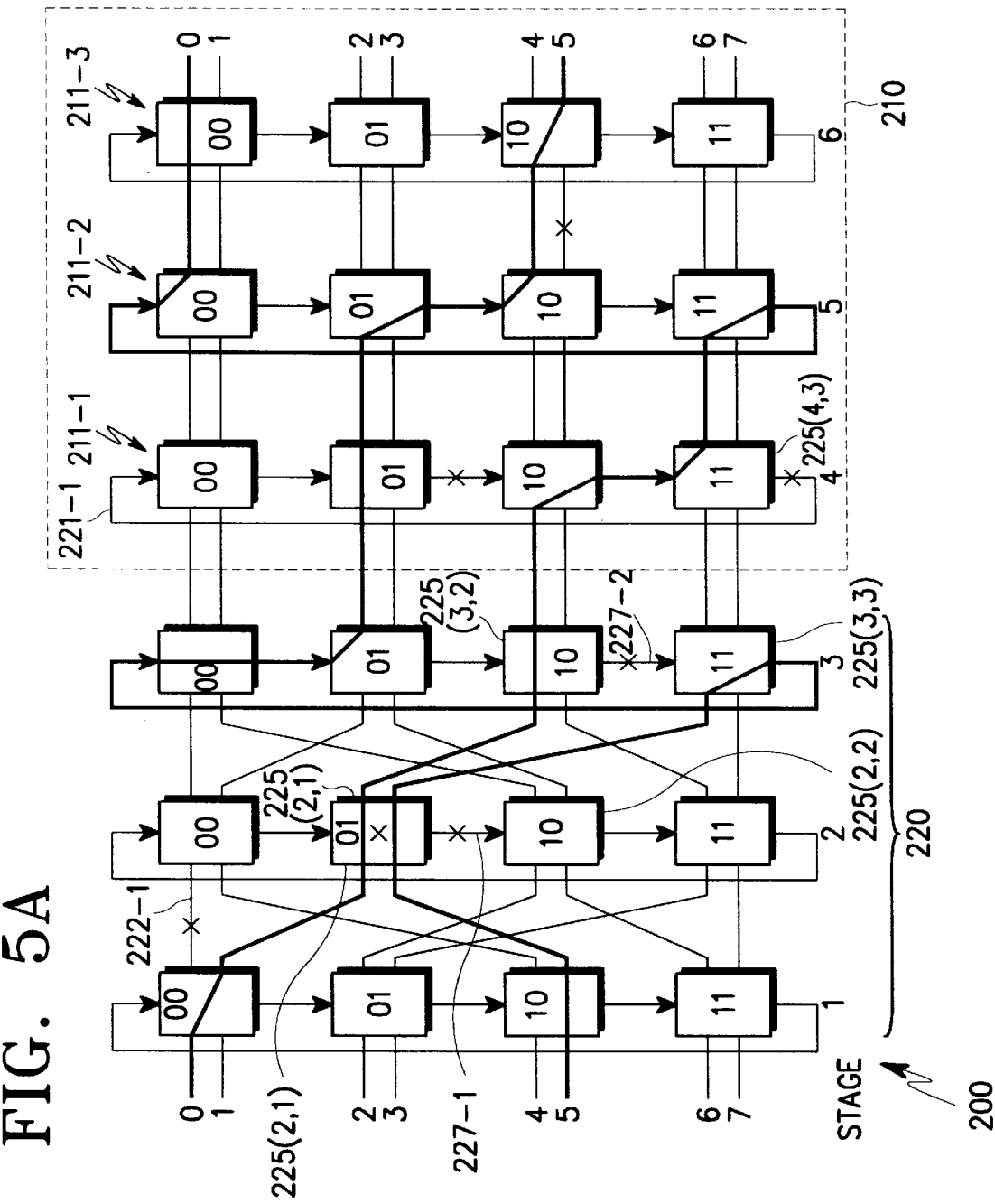
FIGS. 5A and 5B are block diagrams illustrating how packets are transferred through the augmented ring-banyan network of FIG. 4 by a routing control method in accordance with the present invention.
Figure 5B:
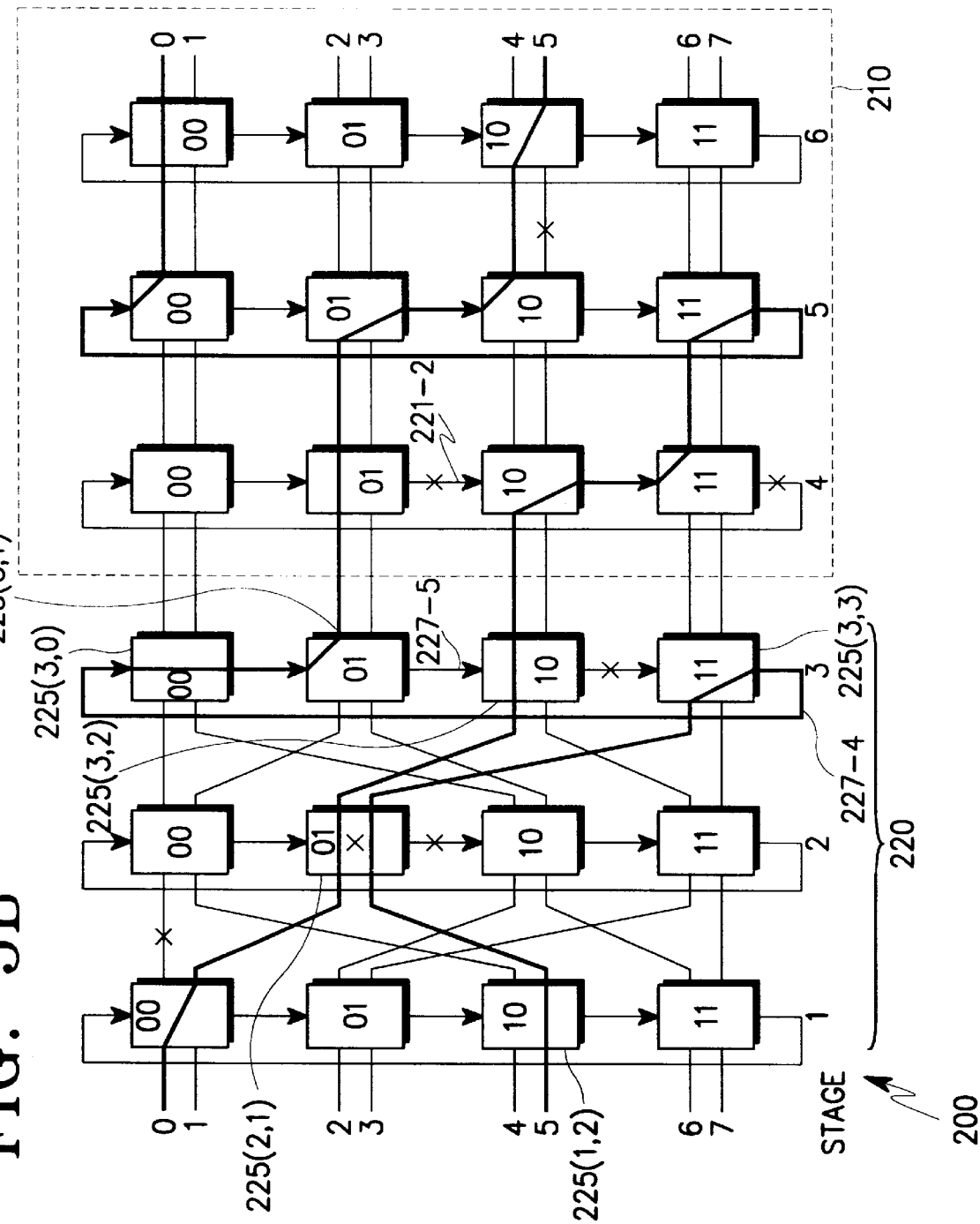

FIGS. 5A and 5B illustrate routing control in augmented ring-banyan network 200 in accordance with the method of Definition 9. Here a packet collision is represented by the symbol "X". In one case, a packet tries to move from the input node 0 (i.e., link position 0) to the output node 0. As indicated in FIG. 5A, however, a collision occurs at interstage connection 222-1. In response to this situation, collision switch element 225(1,0) transfers the packet from the intended output link, now blocked by the collision, to another output link. The packet then travels through ring-banyan network 220 along an alternate path in accordance with the routing control method of Definition 7.

The objective of Definition 7's routing control method is to send the redirected packet to a switch element equivalent to the intended switch element 225(3,0), that is, a switch element sharing a spanning tree in common with switch element 225(3,0). Two such equivalent switch elements are switch element 225(2,2) in stage 2 and switch element 225(3,3) in stage 3. Unfortunately, in this case, the links to each of these equivalent switch elements are blocked by collisions. Switch element 225(2,1) receives the packet, and would transfer it to switch element 225(2,2) but for the collision at intrastage connection 227-1. The packet, therefore, travels instead to switch element 225(3,2), which in turn would transfer it to switch element 225(3,3) but for the collision at intrastage connection 227-2. The packet consequently exits ring-banyan network 220 from switch element 225(3, 2), rather than from switch element 225(3,0).

Without augmenting block 210, this packet would be discarded. The additional stages 211-1, 211-2, and 211-3, however, provide sufficient additional paths to allow the packet to reach its designated output port in accordance with the simplified routing method of Definition 9. One notes that the method of Definition 9 directs the packet to switch element 225(4,3), which would send the packet out on intrastage connection 221-1. However, another collision blocks this path. Definition 9's method therefore, selects an alternate port, and the packet subsequently makes its way successfully to the designated output port.

FIG. 5B details a second case in which a packet enters network 200 at input port 5 and has output port 5 as its designated output port. The packet's path, according to the method of Definition 7, would proceed successively through switch elements 225(1,2), 225(2,1) and 225(3,2) to the designated output port of ring-banyan network 220. However, the path is blocked within switch element 225(2,1) (due to an internal collision, or perhaps due to a fault in the circuit) and the routing method redirects the packet to switch element 225(3,3). The loss resistance features of the routing method again function to direct the packet through intrastage connection 227-4 to switch element 225(3,0). The packet would proceed to switch element 225(3,2), at its correct level for output, but for a collision at intrastage connection 227-5. Instead, it exits ring-banyan network 220 from switch element 225(3,1).

As in the previous example, this packet could not reach its correct output level within ring-banyan network 220 and, therefore, without augmenting block 210, it would be discarded. It instead proceeds to stages 4, 5, and 6 of augmenting block 210, which provide additional paths that allow it to reach the correct level. One notes that here the packet would move from level 1 to level 2 (the correct level) at stage 4, but a collision in intrastage connection 221-2 blocks this path. The method of Definition 9, therefore, sends the packet on to stage 5, where it successfully reaches the correct level 2 for output from network 200.

A further advantageous feature of augmenting block 210 arises indirectly from the network topology as set forth in Definition 8. One observes that, for a banyan network, such as the delta network defined by Definition 1, each switch element has several input links and several output links. Moreover, except for switch elements in stage 1, the input links of a switch element connect to switch elements at different levels of the preceding stage. Similarly, in all but the final stage, the output links of a switch element connect to switch elements at different levels of the succeeding stage. For example, in FIG. 3, the input links of switch element 125(2,7) connect to switch element 125(1,3) at level 3, and switch element 125(1,7) at level 7. The output links of switch element 125(2,7) connect, in turn, to switch elements 125(3,7) and 125(3,6).

Switch elements for a banyan network, therefore, require several physical input links and several physical output links because their logical links connect to physically separated receiving or transmitting units. Such switch elements may have a structure similar to switch element 50 shown in FIG. 2, which is suitable in particular for ring-banyan applications.

The structure of augmenting block 210 differs from banyan structures because both output links connect to the same succeeding switch element, and both input links connect to the same preceding switch element. This can be seen by comparing, in FIG. 4, interstage connections 222 of ring-banyan network 220 with interstage connections 229 of augmenting block 210. The precise topological difference between these two configurations can be seen by comparison of Definition 1 with Definition 8.

Unlike a banyan structure, therefore, a network conforming to Definition 8 does not require a separate physical link for each logical connection between switch elements. For example, FIG. 4 depicts switch elements 215(4,2) and 215(5,2) connected by interstage connections 229-1 and 229-2. These logical connections can be implemented in an augmenting network, such as augmenting block 210, by multiplexing signals between the two switch elements over a single physical link.

FIG. 6 shows a block diagram of a switch element 250 having a single input link 251 and a demultiplexer 252 that separates two distinct logical channels arriving at input link 251 in the same signal. A single output link 253 sends out a multiplexed signal generated by a multiplexer 254, which combines distinct logical interstage connections into a single output signal. Switch element 250 also includes a chain-in link 255 and a chain-out link 257, which make this switch configuration suitable for use in the augmenting stages of augmenting block 210. This arrangement would have particular advantages in situations, for example, where additional physical links incur high added costs, or where hardware faults in the physical links are rare but, more frequently congestion causes collisions at logical links.

Figure 7:
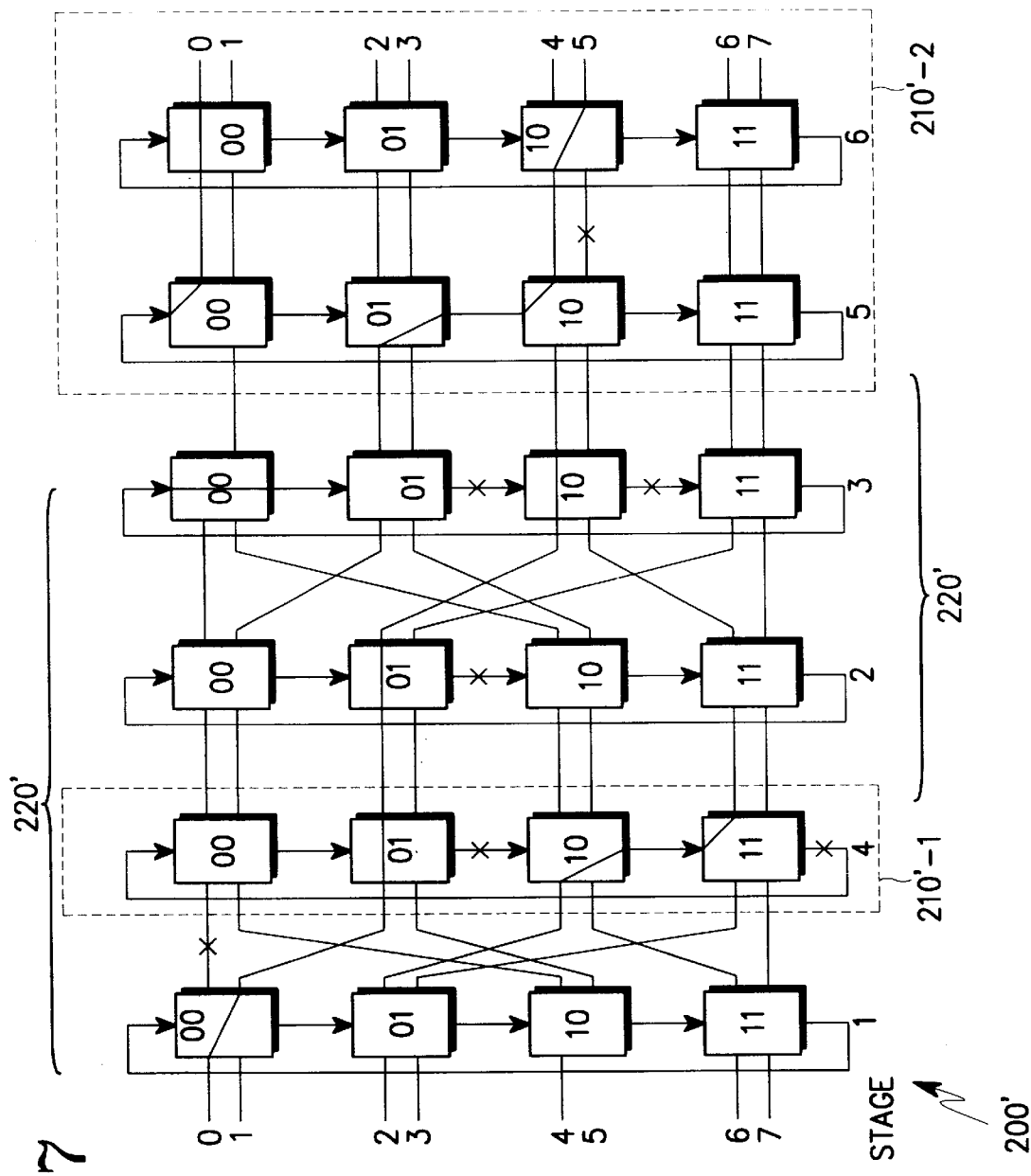
FIG. 7 shows a block diagram of an augmented ring-banyan network in accordance with an alternative embodiment of the present invention.

FIG. 7 shows an augmented ring-banyan network 200' that provides an alternative embodiment of the present invention generalizing the configuration shown in FIG. 4. An augmenting section 210' includes three stages and a connection topology in accordance with Definition 8, just as was the case with augmenting block 210 of FIG. 4. In this case, however, augmenting section 210' includes an interposed part 210'-1 consisting of a single stage, numbered as stage 4, interposed between stages 1 and 2 of a ring-banyan network 220'. A terminal part 210'-2 connects to the output links of stage 3 of ring-banyan network 220', just as augmenting block 210 connects the the output links of stage 3 of ring-banyan network 220 in FIG. 4. Terminal part 210'-2 includes additional stages 5 and 6.

Definition 8 provides the topological definition for the connections from all switch elements included in augmenting section 210', in the same manner as for augmenting block 210. With the numbering of stages as shown in FIG. 7, the routing method of Definitions 7 and 9 directly applies to network 200'. Generally, interspersed augmenting stages, such as stage 4 of interposed part 210'-1, should be numbered as augmenting stages i, where $i \geq l+1$, just as if they were included as terminal augmenting stages such as stages 5 and 6 of terminal part 210'-2. This numbering convention ensures consistency when the routing method of Definitions 7 and 9 is applied.

Consequently, the present invention provides significant advantages for the design of high performance ATM switching systems in terms of cost effectiveness and enhanced performance relative to existing ring-banyan networks. It is also noted that the present invention applies, with changes well within the ability of persons of ordinary skill in the networking arts, to networks configured with switch elements having more than the two input links and two output links of switch element 50 shown in FIG. 2. Moreover, the present invention can also be applied, with changes within the ordinary skill in the art, to MIN systems of types other than ring-banyan or banyan configurations.

Although the present invention is described in detail above with reference to various specific embodiments, this description should not be construed in any way as a limitation upon the scope of the invention. It will be apparent to those skilled in the art that many changes and modifications may be made thereto without departing from the present invention as claimed below. Therefore, the appended claims are intended to cover all such changes and modifications and should be construed to be limited only by their express terms.

What is claimed is:

1. An augmented ring-banyan network, comprising:
   a ring-banyan network including at least one main stage and a final stage, with each one of said final stage and said at least one main stage having $m_1$ levels arranged consecutively from a first level to an $m_1$-st level, and having disposed at each said level a first switch element that includes $m_2$ input links and $m_2$ output links, where $m_1$ and $m_2$ are first and second predetermined positive integers, respectively, with $m_1 \geq 2$ and $m_2 \geq 2$;

a first augmenting stage having $m_1$ levels arranged consecutively from a first level to an $m_1$-st level, and having disposed at each said level a second switch element that includes $m_2$ input links, $m_2$ output links, a chain-in link, and a chain-out link; and a second augmenting stage having $m_1$ levels arranged consecutively from a first level to an $m_1$-st level, and having disposed at each said level a third switch element that includes $m_2$ input links, $m_2$ output links, a chain-in link, and a chain-out link;

wherein for each k with $1 \leq k \leq m_1$;

each input link of said second switch element disposed at said k-th level of said first augmenting stage connects to one of said output links of said first switch element disposed at said k-th level of said final stage, and said chain-out link of said second switch element disposed at said k-th level of said first augmenting stage connects with said chain-in link of said second switch element disposed at said $[(k+1) \bmod m_1]$-st level of said first augmenting stage; and each input link of said third switch element disposed at said k-th level of said second augmenting stage connects to one of said output links of said second switch element disposed at said k-th level of said first augmenting stage, and said chain-out link of said third switch element disposed at said k-th level of said second augmenting stage connects with said chain-in link of said third switch element disposed at said $[(k+1) \bmod m_1]$-st level of said second augmenting stage.

2. The augmented ring-banyan network of claim 1, wherein said at least one main stage include a first main stage and a second main stage, and further including a third augmenting stage interposed between said first main stage and said second main stage, and having $m_1$ levels arranged consecutively from a first level to an $m_1$-st level, and having disposed at each said level a fourth switch element that includes $m_2$ input links, $m_2$ output links, a chain-in link, and a chain-out link, wherein for each k with $1 \leq k \leq m_1$:

said $m_2$ output links of said first switch element disposed at said k-th level of said first main stage are arranged consecutively from a zero-th output link to an $(m_2-1)$-st output link;

for each j with $0 \leq j \leq m_1-1$, said j-th output link of said first switch element disposed at said k-th level of said first main stage connects to one of said input links of said fourth switch element disposed at said $[(j+k) \bmod m_1]$-th level of said third augmenting stage;

each input link of said first switch element disposed at said k-th level of said second main stage connects to one of said output links of said fourth switch element disposed at said k-th level of said third augmenting stage; and said chain-out link of said fourth switch element disposed at said k-th level of said second augmenting stage connects with said chain-in link of said fourth switch element disposed at said $[(k+1) \bmod m_1]$-st level of said third augmenting stage.

3. The augmented ring-banyan network of claim 2, wherein $m_2=2$.

4. The augmented ring-banyan network of claim 3, wherein said at least one main stage comprises L stages and $m_1=2^L$, where L is and integer with $L \geq 1$.

5. The augmented ring-banyan network of claim 1, further comprising a third augmenting stage having $m_1$ levels arranged consecutively from a first level to an $m_1$-st level, and having disposed at each said level a fourth switch element that includes $m_2$ input links, $m_2$ output links, a chain-in link, and a chain-out link;

wherein for each k with $1 \leq k \leq m_1$, each input link of said fourth switch element disposed at said k-th level of said third augmenting stage connects to one of said output links of said third switch element disposed at said k-th level of said second augmenting stage, and said chain-out link of said fourth switch element disposed at said k-th level of said third augmenting stage connects with said chain-in link of said fourth switch element disposed at said $[(k+1) \bmod m_1]$-st level of said third augmenting stage.

6. An augmented ring-banyan network, comprising:

a ring-banyan network including at least one main stage and a final stage, with each one of said final stage and said at least one main stage having $m_1$ levels arranged consecutively from a first level to an $m_1$-st level, and having disposed at each said level a first switch element that includes $m_2$ input links and $m_2$ output links, where $m_1$ and $m_2$ are first and second predetermined numbers, respectively;

a first augmenting stage having $m_1$ levels arranged consecutively from a first level to an $m_1$-st level, and having disposed at each said level a second switch element that has a chain-in link, a chain-out link, $m_2$ input links, exactly $m_3$ output links, and a multiplexer, with $m_3 < m_2$; and a second augmenting stage having $m_1$ levels arranged consecutively from a first level to an $m_1$-st level, and having disposed at each said level a third switch element that has a chain-in link, a chain-out link, exactly $m_3$ input links, exactly $m_3$ output links, a demultiplexer coupled to said input links, and a multiplexer coupled to said output links;

wherein for each k with $1 \leq k \leq m_1$;

each input link of said second switch element disposed at said k-th level of said first augmenting stage connects to one of said output links of said first switch element disposed at said k-th level of said final stage, and said chain-out link of said second switch element disposed at said k-th level of said first augmenting stage connects with said chain-in link of said second switch element disposed at said $[(k+1) \bmod m_1]$-st level of said first augmenting stage; and each input link of said third switch element disposed at said k-th level of said second augmenting stage connects to one of said output links of said second switch element disposed at said k-th level of said first augmenting stage, and said chain-out link of said third switch element disposed at said k-th level of said second augmenting stage connects with said chain-in link of said third switch element disposed at said $[(k+1) \bmod m_1]$-st level of said second augmenting stage.

7. An adaptive self-routing control method for an augmented ring-banyan network, comprising the steps of:

receiving a data unit at a switching element disposed at a k-th level among $m_1$ levels arranged consecutively from a first level to an $m_1$-st level within an augmenting stage of said augmented ring-banyan network, wherein said switching element includes a chain-out link and $m_2$ output links arranged consecutively from a first output link to an $m_2$-th output link;

detecting a value of a deviation tag included in said data unit;

executing a first link selection procedure when said value is zero, said first link selection procedure including the steps of:

selecting said first output link as a selected link through which to output said data unit, replacing said j-th output link with said (j+1)-st output link as said selected link when said k-th output link has been selected as said selected link, when output of said data unit through said k-th output link has failed, and when $k<m_2$, and replacing said $m_2$-th output link with said chain-out link as said selected link when said $m_2$-th output link has been selected as said selected link and when output of said data unit through said $m_2$-th output link has failed; and executing a deviation tag updating procedure upon said deviation tag, said deviation tag updating procedure including the steps of:

incrementing said deviation tag by an incremental step of unity when said deviation tag has a value of zero and said chain-out link has been selected as said selected link, and decrementing said deviation tag by a decremental step of unity when said deviation tag has a value not equal to zero and said chain-out link has been selected as said selected link.

8. The augmented ring-banyan network of claim 1, wherein $m_2=2$.

9. The augmented ring-banyan network of claim 8, wherein said at least one main stage comprises L stages and $m_1=2^L$, where L is and integer with $L \geq 1$.

* * * * *